United States Patent [19]
Kawase

[11] Patent Number: 4,929,810
[45] Date of Patent: May 29, 1990

[54] WIRE CUT ELECTRIC DISCHARGE MACHINE

[75] Inventor: Hiroyasu Kawase, Aichi, Japan

[73] Assignee: Mitsubishi Denki Kabushiki Kaisha, Tokyo, Japan

[21] Appl. No.: 365,886

[22] Filed: Jun. 14, 1989

[30] Foreign Application Priority Data

Jul. 6, 1988 [JP] Japan ................... 63-166947

[51] Int. Cl.⁵ .................. B23H 7/10; B21F 11/00
[52] U.S. Cl. ..................... 219/69.12; 83/16; 140/139; 219/10.61 R
[58] Field of Search .............. 140/139, 140; 219/10.61, 10.75, 69.12; 83/16, 17; 364/474.04, 477

[56] References Cited

U.S. PATENT DOCUMENTS 4,537,102  8/1985  Balzer .................... 83/16
4,743,730  5/1988  Martin et al. ........... 219/69.12

FOREIGN PATENT DOCUMENTS 132420   8/1983  Japan .................... 83/15
232830  11/1985  Japan ................. 219/69.12
61-8225   1/1986  Japan ................. 219/69.12
61-26455  6/1986  Japan .
169224   7/1988  Japan ................. 219/69.12

Primary Examiner—A. D. Pellinen
Assistant Examiner—Geoffrey S. Evans
Attorney, Agent, or Firm—Sughrue, Mion, Zinn, Macpeak & Seas

[57] ABSTRACT

A wire cut discharge machine comprises a wire electrode, wire electrode feeding rollers, a tension applying unit for applying a tension to the wire electrode, a current applying unit for applying a high frequency current to the wire electrode, and a wire electrode retaining roller. Each of the tension applying unit and the current applying unit includes selecting unit having a plurality resistors different in resistance, and a plurality of make contacts of relay. The selecting units select a best tension and a best current for a wire electrode to be cut according to a diameter and a kind of the wire electrode.

7 Claims, 3 Drawing Sheets

WIRE CUT ELECTRIC DISCHARGE MACHINE

BACKGROUND OF THE INVENTION

This invention relates to a wire cut electric discharge machine in which the tension and the fusing current of a wire electrode are automatically controlled to cut the latter by fusing.

FIG. 1 is an explanatory diagram showing one example of a wire electrode cutting section in a conventional wire cut discharge machine. In FIG. 1, reference numeral 1 designates a wire electrode; 2, a workpiece to be machined with the wire electrode 1; 3, a cutter blade for cutting the wire electrode 1; 4, an air cylinder coupled to the cutter blade 3; 5 and 6, air pressure sources connected to the air cylinder 4 to move the cutter blade 3 back and forth; 7, a cuter blade receiving member used in cutting the wire electrode 1; 8, a power source for inducing pulse discharges between the workpiece 2 and the wire electrode 1; 9, a machining start hole formed in the workpiece 2; and 10, an electric feeder die.

The operation of the wire cut electric discharge machine will be described. After the workpiece has been machined, the wire electrode 1 is cut with the cutter blade 3, to remove the used part thereof. In this case, the air pressure source 5 is used to apply an air pressure to the cylinder 4 to move the cutter blade 3 toward the wire electrode 1, so that the cutting of the wire electrode 1 is carried out between the cuter blade 3 and the cutter blade receiving member 7. In this operation, depending on the diameter and kind of the wire electrode 1, the angle of the cutter blade 3 to the wire electrode 1 and the force of pushing it against the latter 1 are changed so that the section of the wire electrode thus cut be as circular as possible. Thereafter, the air pressure source 6 is activated to move the cutter blade 3 away from the wire electrode. The wire electrode 1 thus cut is inserted into a machining start hole 9 in another workpiece 2 and then into the electric feed die 10. Under this condition, discharge energy is supplied through a wire supplying path from the power source 8, to machine the workpiece 1.

As was described above, in the case of the conventional wire cut electric discharge machine, in order to insert the wire electrode into the electric feeder die with ease, the wire electrode cut in the above-described manner must be substantially circular in section, and in order to meet this requirement, it is necessary to mechanically adjust the angle of the cutter blade to the wire electrode and the force of pushing it against the latter depending on the diameter and the kind of the wire electrode. This mechanical adjustment is considerably troublesome. And often the wire electrode thus cut is not circular in section. In this case, it may be difficult to insert the wire electrode into the hole of the electric feeder die.

In order to overcome the above-described difficulties a method of fusing a wire electrode has been proposed in the art, for instance, by Examined Japanese Patent application Publication No. 26455/1986. In the method, current is applied to a wire electrode while a force of tension is being applied to it in the axial direction, so that the wire electrode is heated and elongated. As a result, the wire electrode partially becomes smaller in diameter. Under this condition, the application of the tensile strength is suspended, to allow the current to fuse the part of the wire electrode which has been made smaller in diameter, to cut the latter into two parts. The desired one of the two parts is fed to the wire guide and passed through a desired through-hole formed in the workpiece, and the wire electrode is set as required.

As was described above, the conventional method has a variety of advantages; however, it is still disadvantageous in the following points: First, the construction is considerably intricate. The current for heating a wire electrode and the current for fusing it according to the diameter and the kind of the wire electrode must be controlled using variable resistors. In the control operation, after the wire electrode has been heated with the current, the switch provided for the heating current is opened, and then the switch provided for the fusing current is closed. Thus, the control operation is considerably troublesome.

SUMMARY OF THE INVENTION

Accordingly, an object of this invention is to eliminate the above-described difficulties accompanying a conventional wire cut electric discharge machine. More specifically, an object of the invention is to provide a wire cut electric discharge machine which is free from the difficulty that it is necessary to operate the variable resistors according to the diameter and the kind of a wire electrode employed, and in which the wire electrode can be cut in such a manner that it substantially circular in section. In a wire cut electric discharge machine, the wire electrode may be cut by abnormal current during electro-discharge machining. The invention is not related to such a phenomenon, but to the case where the wire electrode is intentionally cut for instance at the end of a machining operation.

The foregoing object of the invention has been achieved by the provision of a wire cut electric discharge machine which, according to the invention, comprises: first means for applying a force of tension to a wire electrode to cut it; and second means for applying a current to the wire electrode to heat it, each of said first and second means having selecting means for automatically selecting a force of tension and a current which are best for a wire electrode to be cut according to the diameter and the kind of the wire electrode.

In the wire cut electric discharge machine of the invention, the wire is cut as follows. First, the force of tension and the current most suitable for cutting the wire electrode are automatically selected. Then, while the first means for applying a force of tension is controlled according to the force of tension thus selected, the second means for applying current is brought into contact with the wire electrode to apply the current thus selected to heat the wire electrode thereby to cut it by fusing.

BRIEF DESCRIPTION OF THE OF DRAWINGS

DESCRIPTION OF THE PREFERRED EMBODIMENT

Figure 1:
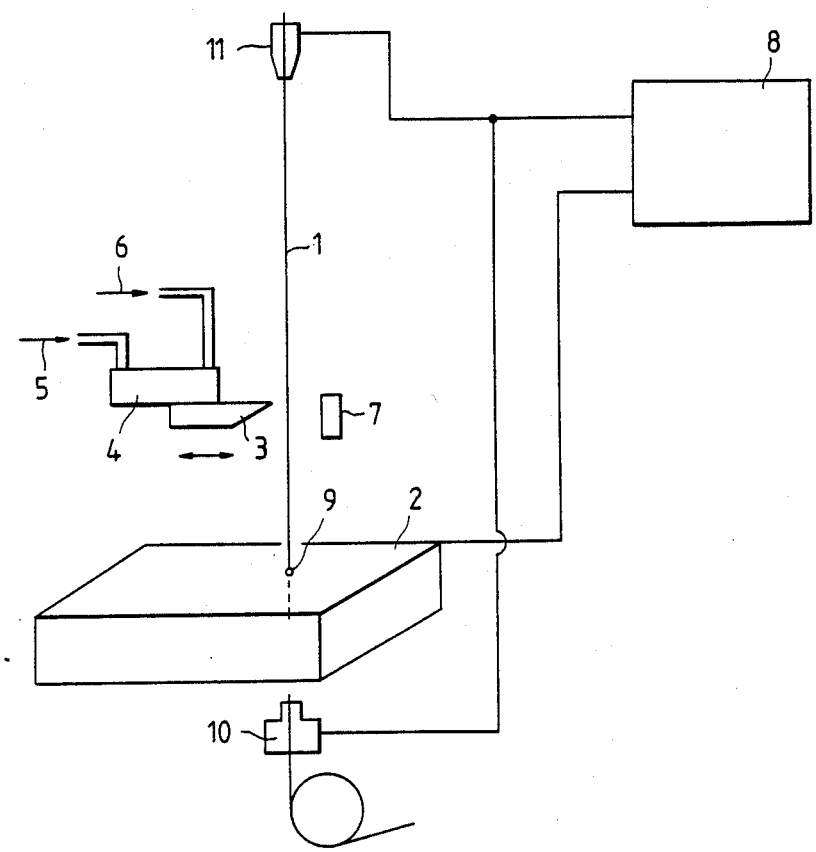
FIG. 1, is an explanatory diagram showing one example of a wire electrode cutting section in a conventional wire cut electric discharge machine.
Figure 2:
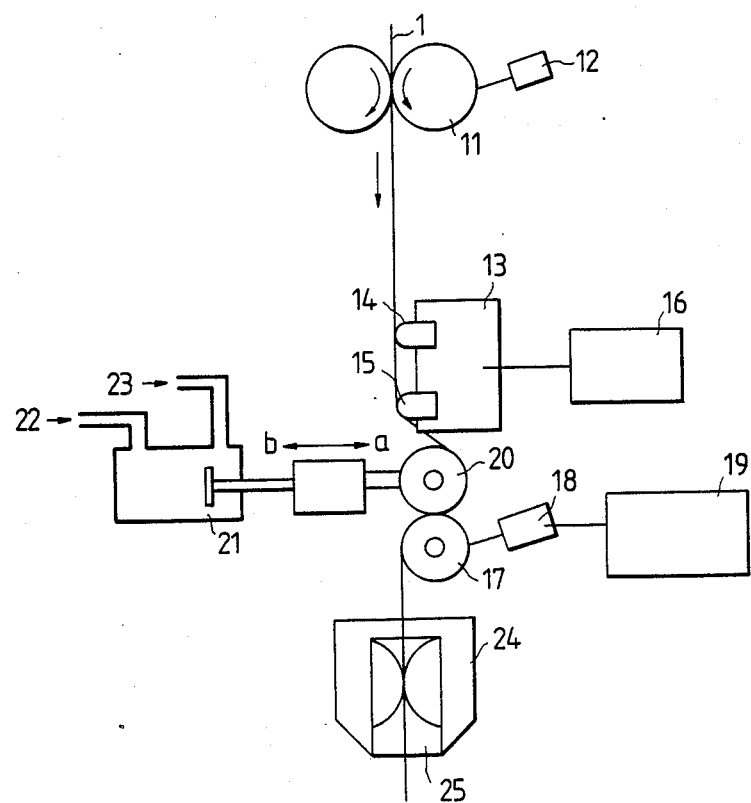
FIG. 2 is an explanatory diagram showing one embodiment of this invention.

FIG. 2 is an explanatory diagram showing one embodiment of this invention. In FIG. 2, reference numeral 1 designates a wire electrode which is fed in the direction of the arrow by wire-electrode feeding rollers 11 driven by a motor 12; 13, a cutting unit for the wire electrode 1, the cutting unit 13 comprising an upper electric feeder element 14 and a lower electric feeder element 15 which are disposed close to the wire electrode 1, and a cutting circuit 16 for controlling a cutting current; 17, a wire electrode cutting roller coupled to a motor 18 which is controlled by a control circuit 19; 20, a wire electrode retaining roller coupled to an air cylinder 21, the retaining roller 20 being moved in the direction of the arrow (a) or (b) by receiving air pressure from an air pressure source 22 or 23; a guide nozzle provided below the cutting roller 17, the guide nozzle comprising an electric feeder die 25 into which the wire electrode 1 is inserted.

Figure 3:
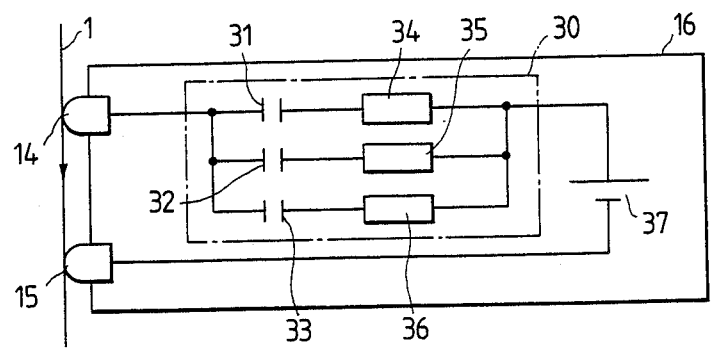
FIG. 3 is a circuit diagram showing one example of a cutting circuit shown in FIG. 2.

FIG. 3 is an electric circuit showing one example of the cutting circuit 16. In FIG. 3, reference numerals 31, 32 and 33 designate make contact means of a relay; and 34, 35 and 36, resistors different in resistance. The make contact means 32 and the resistor 34 form a first series circuit; the make contact means 32 and the resistor 35 form a second series circuit; and the make contact means 33 and the resistor 36 form a third series circuit. The first, second and third series circuits are connected in parallel to one another, thus forming a parallel circuit 30. The parallel circuit 30 and a DC source 37 are connected in series between the upper electric feeder element 14 and the lower electric feeder element 15, thus forming the above-described cutting circuit 16.

Figure 4:
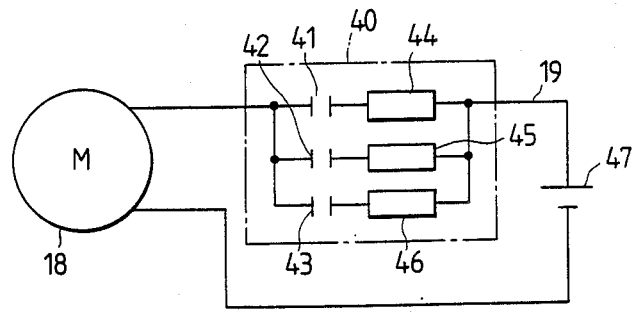
FIG. 4 is a circuit diagram showing one example of a control circuit shown in FIG. 2.

FIG. 4 is a circuit diagram showing example of the control circuit 19. Similarly as in the above-described cutting circuit, make contact means 41, 42 and 43 of a relay are connected in series to resistors different in resistance, thus forming first, second and third series circuits, respectively. The series circuits are connected in parallel to one another, thus forming a parallel circuit 40. The parallel circuit 40 and a DC source 47 are connected in series between the input terminals of the motor 18.

The operation of the wire cut electric discharge machine thus constructed will be described.

After the workpiece has been machined, the wire electrode 1 is cut as follows: First, air pressure is applied from the air pressure source 22 to the air cylinder 21, to move the piston forwardly thereby to move the retaining roller 20 in the direction of the arrow (a). As a result, the wire electrode 1 is brought into contact with the upper and lower electric feeder elements 14 and 15, and held between the retaining roller 20 and the cutting roller 17.

On the other hand, cutting circuit 16 detects the diameter and the kind of the wire electrode 1, and selects the resistor (34 for instance) having the resistance corresponding to the result of detection, and closes the make contact means 31 connected to the resistor 34. As a result, a closed loop consisting of the DC source 37, the resistor 34, the make contact means 31, the upper electric feeder element 14, the wire electrode 1 and the lower electric feeder element 25 is formed, so that current is applied most suitably to the wire electrode between the two electric feeder elements 14 and 15.

Similarly, in the control circuit 19, the resistor (44 for instance) corresponding to the diameter and the kind of the wire electrode is selected. Therefore, current is applied to the motor 18 through the circuit including the resistor 44 by the power source 47, to control the torque of the motor 18, thereby to adjust the tension of the wire electrode 1 between the wire electrode feeding rollers 11 and the cutting roller 17.

Thus, the wire electrode 1 between the upper and lower electric feeder elements 14 and 15 is heated by the current provided by the cutting circuit 16, and is most suitably stretched by the cutting roller 17. Therefore, the wire electrode 1 is cut when its temperature reaches a certain value.

As is apparent from the above description, by setting the current and the tensile strength for cutting the wire electrode by fusing to most suitable values according to the diameter and the kind of the wire electrode, the wire electrode can be cut in such a manner that its section is substantially circular. Therefore, the wire electrode thus cut can be readily inserted into the electric feeder die 15.

Figure 5:
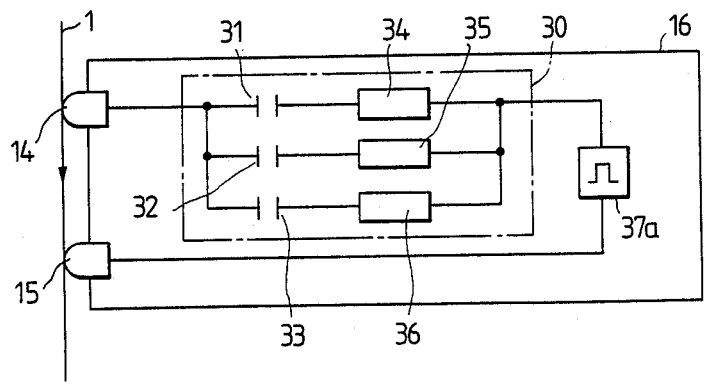
FIG. 5 is a circuit diagram showing another example of the cutting circuit.

FIG. 5 is a circuit diagram showing another example of the cutting circuit 16. The cutting circuit shown in FIG. 5 is different from that shown in FIG. 3 in that, instead of the DC source 37 in FIG. 3, a high-frequency pulse power source 37a is employed so that a high-frequency pulse current is most suitably applied to the wire electrode 1 between the two electric feeder elements 14 and 15 to heat the wire electrode 1.

With the cutting circuit 16 of FIG. 5, the high-frequency pulse current produces a skin effect on the wire electrode, as a result of which the wire electrode is cut more circular in section. In this case, the power consumption is smaller than that in the case where the DC source is used.

In selecting one of the resistors 34, 35 and 36 in the cutting circuit 16 in accordance with the diameter and the kind of a wire electrode 1 used, or in selecting one of the resistors 44, 45 and 46 in the control circuit 19 in the same manner, it is preferable that a data table including the diameters and the kinds of a variety of wire electrodes 1 to be used, the tensile strengths (or the torques of the motor 17) and current values required for fusing these wire electrodes are stored in memory in the NC device in advance. In this case, by inputting the diameter and the kind of a wire electrode to be cut into the NC device, the resistor corresponding to the data thus inputted is selected by the NC device, so that the make contact means connected to the resistor thus selected is closed to apply current to the wire electrode. Thus, the wire cutting operation can be carried out in automation.

In the above-described embodiment, the current of the cutting circuit 16 and the torque of the motor 18 driving the cutting roller 17 are automatically selected according to the diameter and the kind of a wire electrode to be cut, so that the latter is cut with the most suitable current and torque. The same circuit may be provided for the wire electrode feeding motor 12. Furthermore, in the cutting circuit and in the control circuit, the resistors different in resistance and the make contact means form the three series circuits, which are connected in parallel to one another. The series circuits may be increased in number according to the diameters and the kinds of wire electrodes to be used.

As is apparent from the above description, according to the invention, the means for automatically selecting a tensile strength and a fusing current for a wire electrode according to its diameter and kind are provided. Therefore, with the wire cut electric discharge machine of the invention, the wire electrode can be cut substantially circular in section. Accordingly the wire electrode thus cut can be readily inserted into the small hole of the electric feeder die, and it will never be caught in the electric feeder die during automatic operation, and accordingly the machining operation will never be suspended in the course. Furthermore, the electric discharge machine of the invention, being simple in construction and having the means for selecting a force of tension and a fusing current for a wire electrode to be used as was described above, can be operated with ease and is greatly improved in working efficiency. Thus, the electric discharge machine of the invention should be highly appreciated in practical use.

What is claimed is:

1. A wire cut electric discharge machine comprising:
   a wire electrode confronted with a workpiece with a small gap therebetween;
   wire electrode feeding rollers driven by a driving motor;
   first means for applying a force of tension to said wire electrode to cut said wire electrode, which including controlling circuit having first selecting means for automatically selecting a force of tension which is best for said wire electrode to be cut according to the diameter and kind of said wire electrode;
   second means for applying a current to said wire electrode to fuse said wire electrode, which including a cutting portion and a cutting circuit, said cutting circuit having second selecting means for automatically selecting a current which is best for a wire electrode to be cut according to the diameter and the kind of said wire electrode; and
   a wire electrode retaining roller coupled to an air cylinder which is moved by receiving air pressure from an air pressure source.

2. The machine as claimed in claim 1, wherein said cutting circuit comprising a high-frequency pulse power source.

3. The machine as claimed in claim 1, wherein said first selecting means comprises a plurality of series circuit including a plurality of resistors different in resistance and a plurality of make contact means of relay means which are connected to said resistors, said plurality of series circuit being connected in parallel to one another to form a parallel circuit, said parallel circuit and a power source being connected in series between input terminals of a motor which drives a roller to stretch said wire electrode tight.

4. The machine as claimed in claim 1, wherein said second selecting means comprises a plurality of series circuit including a plurality of resistors different in resistance and a plurality of make contact means of relay means which are connected to said resistors, said plurality of series circuit being connected in parallel to one another to form a parallel circuit, said parallel circuit and a power source being connected in series between the upper and lower electric feeder elements which are brought into contact with a wire electrode.

5. The machine as claimed in claim 4, wherein said power source comprising a high-frequency pulse power source.

6. The machine as claimed in claim 1, further comprising:
   memory means for storing a data table including the diameters and the kinds of a variety of wire electrodes to be used, and forces of tension and current values necessary for cutting said wire electrodes by fusing so as to select one of resistors in said parallel circuit in each of said first and second means automatically by inputting the diameter and the kind of a wire electrode to be cut.

7. The machine as claimed in claim 6, wherein said cutting circuit comprising a high-frequency pulse power source.

* * * * *